INVENTOR
JAMES GORDON BURT
BY
ATTORNEY

INVENTOR
JAMES GORDON BURT
BY
ATTORNEY

United States Patent Office
3,728,268
Patented Apr. 17, 1973

3,728,268

MIXTURES OF 1,1,2 - TRICHLORO-1,2,2-TRIFLUOROETHANE, ETHANOL AND ACETONE AND A TERNARY AZEOTROPE THEREOF

James Gordon Burt, Oxford, Pa., assignor to E. I. du Pont de Nemours and Company, Wilmington, Del.

Filed Dec. 11, 1970, Ser. No. 97,141
Int. Cl. C09d *9/00;* C11d *7/50;* C23g *5/02*
U.S. Cl. 252—170 2 Claims

ABSTRACT OF THE DISCLOSURE

A mixture of 1,1,2-trichloro-1,2,2-trifluoroethane, ethanol and acetone and a ternary azeotrope thereof, said mixture containing from about 82.3 to about 89.2 weight percent 1,1,2-trichloro-1,2,2-trifluoroethane and from about 0.8 to about 4.5 weight percent ethanol and said azeotrope containing about 86.4 weight percent 1,1,2-trichloro-1,2,2-trifluoroethane and about 1.6 weight percent ethanol and having a minimum boiling point of about 43.6° C.

BACKGROUND OF THE INVENTION

(1) Field of the invention

This invention relates to novel mixtures of 1,1,2-trichloro-1,2,2-trifluoroethane, ethanol and acetone which may be used as solvents, particularly as solvents for the removal of degraded rosin fluxes from soldered circuit boards.

(2) Description of the prior art

The manufacture of circuit boards and their assembly into electronic devices are important processes in the electronics industry. A description of such processes may be found, for example, in Printed and Integrated Circuitry, Materials and Processes, McGraw-Hill Book Co., Inc., New York, New York (1963) by Schlaback et al.

Basically, a circuit board consists of a plate of electrically resistant plastic normally reinforced by glass fibers and typically about 1/16 inch (1.6 mm.) thick, having installed on one side thereof electrical connectors. The connectors are thin flat strips usually of copper strongly adhered to the plate. Holes passing through the plate and the appropriate part of the circuit provide access for the leads of the electronic components which are mounted on the side opposite the circuit. The leads from the electronic components, which comprise transistors, condensers, transformers, etc., may be riveted or crimped to the circuit. Electrical integrity of the connections is however assured by soldering.

Modern industrial processes of soldering circuit boards comprise coating the entire circuit side of the board with a flux and thereafter passing this side of the board through molten solder.

The preferred fluxes in this use consist for the most part of rosin. Rosin alone is adequate as a flux provided connections to be soldered are clean and uncorroded. Since, however, these parts frequently do not reach the soldering step in this condition, "activated fluxes" which permit the soldering of slightly corroded parts are generally preferred in the trade. Activated rosin fluxes normally contain an amine hydrochloride, usually trimethylamine hydrochloride and oxalic acid additives. Rosin fluxes are dissolved in solvents such as ethanol and ethylene glycol for convenient application to the boards.

After soldering, which degrades a part of the rosin to tar, hereinafter called tarring, the flux is removed from the board by means of an organic solvent which dissolves away the flux. Vapor degreasers are the preferred means for applying the solvent to the boards. In the usual operation of a vapor degreaser, the board is passed through a sump of boiling solvent, which removes the bulk of the rosin, and thereafter through a sump containing freshly distilled solvent at near room temperature, and finally through solvent vapors over the boiling sump which provide a final rinse with clean pure solvent to the board by condensation thereon.

Manko in Solders and Soldering, McGraw-Hill Book Co., Inc., New York, New York (1964), pp. 189–194, 219–222, describes the soldering and flux removal processes in detail and lists defluxing solvents. The use of many of the solvents listed is, however, now considered questionable since they are found to attack the materials of construction of many modern circuit board assemblies. Such materials comprise polymers such as phenol-formaldehyde resins, epoxy resins, polycarbonates, polyethylene, polystyrene, etc. Additionally, the use of many of the listed solvents is undesirable because of their degree of flammability and toxicity. For these reasons less aggressive, non-flammable and non-toxic organic solvents were sought for this use.

1,1,2-trichloro-1,2,2-trifluoroethane, although meeting flammability, toxicity and non-aggressiveness requirements was found to be unsuitable because of inadequate rosin solubility.

The azeotrope of 1,1,2-trichloro-1,2,2-trifluoroethane and about 12.5% by weight acetone was tried and although useful with pure rosin, it was found to fail to remove badly tarred rosin residues in vapor degreaser equipment.

A more active composition was sought in the non-azeotropic mixture of about 35% by weight ethanol in 1,1,2-trichloro-1,2,2-trifluoroethane. This mixture is sufficiently active with rosin fluxes so that it was used for some time in the trade in a room temperature bath in a so-called cold defluxing process. In this process, circuit board assemblies were simply dipped in the mixture and thereafter dried. The vapor degreaser system, which is usually preferred in the trade and which is now called the hot defluxing system, could not however be used because the components of the solvent mixture separate on boiling to produce highly flammable mixtures.

The composition now generally used by the trade is the azeotrope of 1,1,2-trichloro-1,2,2-trifluoroethane and about 4% by weight ethanol. This composition is not sufficiently active for use in the cold defluxing process but is useful in hot defluxing. However, even small loss of ethanol, for example by extraction by water condensed from the atmosphere, such that the ethanol concentration falls below about 2% by weight may render the mixture useless.

A composition has now been discovered which is a mixture of 1,1,2-trichloro-1,2,2-trifluoroethane, ethanol and acetone and which is an effective solvent for removing tarred rosin fluxes from circuit boards in the hot defluxing process without attacking the materials of construction of these circuit boards. Additionally, this mixture is essentially constant boiling thus rendering it stable to distillative separation.

SUMMARY OF THE INVENTION

This invention is directed to an essentially constant boiling composition consisting essentially of acetone, from about 82.3 to about 89.2 weight percent 1,1,2-trichloro-1,2,2-trifluoroethane and from about 0.8 to about 4.5 weight percent ethanol, and a ternary azeotrope thereof. This composition has an essentially constant normal boiling point of about 43.6° C. The ternary azeotrope consists of about 86.4 weight percent 1,1,2-trichloro-1,2,2-trifluoroethane, about 12.0 weight percent acetone and about 1.6 weight percent ethanol and has a boiling point of about 43.6° C.

(a) Those compositions which are operable within the scope of the invention (compositions appearing within the confines of the broken lines parallelogram), (b) Boiling point contour lines for these compositions, and (c) The composition of the ternary azeotrope of 1,1,2-trichloro-1,2,2-trifluoroethane, ethanol and acetone.

Figure 2:
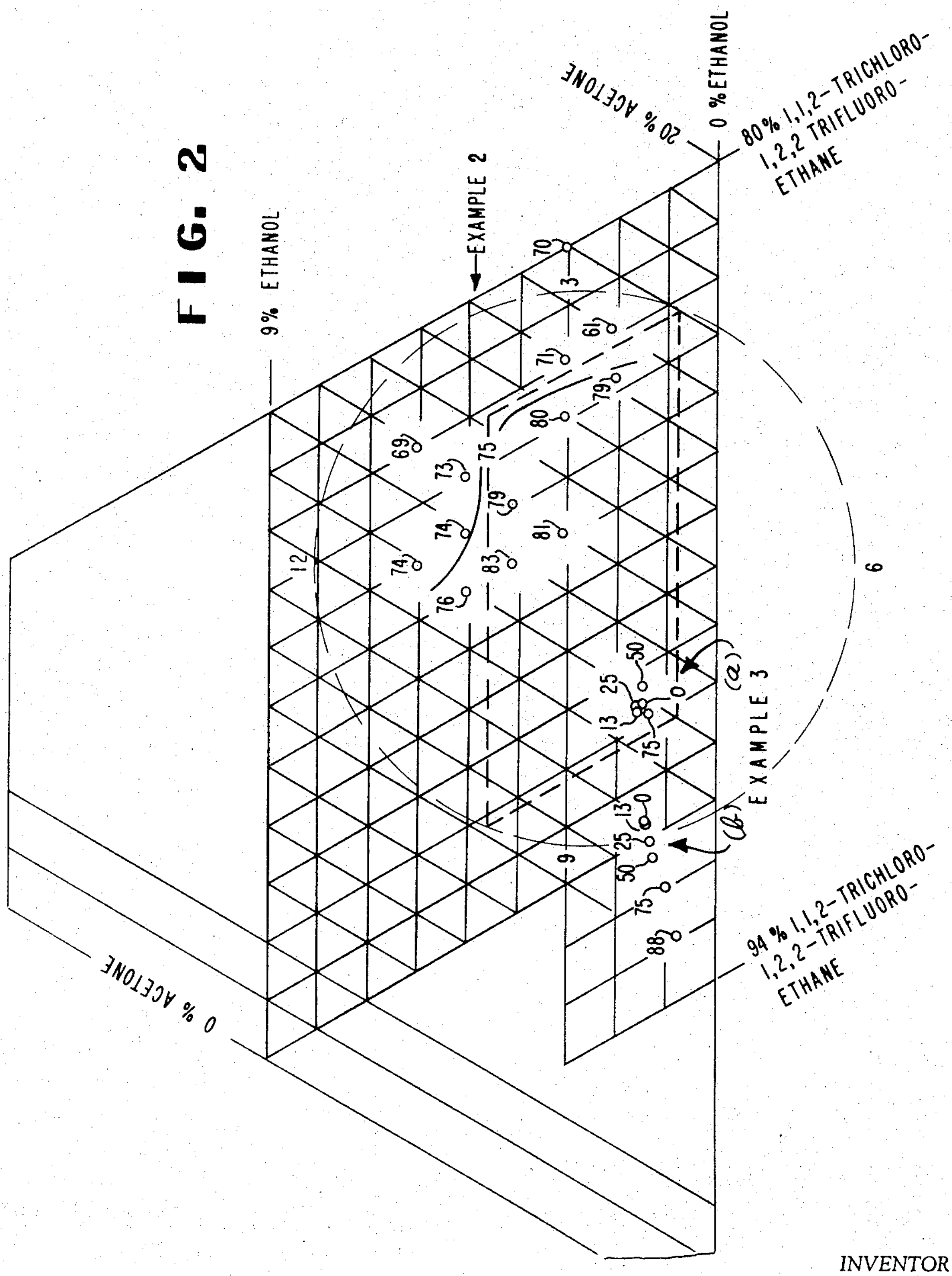

FIG. 2 is a partial triangular coordinate plot for mixtures of 1,1,2-trichloro-1,2,2-trifluoroethane, ethanol and acetone and shows:

(a) Those compositions which are operable within the scope of the invention (compositions appearing within the confines of the broken lined parallelogram), (b) Extent of evaporation expressed in % by volume which is required before the vapor from various mixture residues, both within and without the scope of the invention, become flammable (compositions of this invention appear within the confines of the broken lined parallelogram), and (c) The compositions of various mixture residues both within and without the scope of the invention, upon evaporation up to 88% by volume (compositions of this invention appear within the confines of the broken lined parallelogram).

DESCRIPTION OF THE INVENTION

As stated previously, a mixture of acetone, from about 82.3 to 89.2 weight percent of the 1,1,2-trichloro-1,2,2-trifluoroethane and from about 0.8 to about 4.5 weight percent ethanol has been found to have an essentially constant boiling point of about 43.6° C. The ternary mixture at approximately the midpoint of the compositions of this invention forms a true minimum boiling point azeotrope containing about 86.4 weight percent 1,1,2-trichloro-1,2,2-trifluoroethane, about 12 weight percent acetone and about 1.6 weight percent ethanol. This azeotrope has a boiling point of about 43.6° C. at 760 mm. pressure and lies in terms of boiling point terrain, in a shallow depression such that all compositions of the invention have a narrow boiling point range of from about 43.6° C. to about 43.8° C. (a fluctuation of only about 0.2° C.). Thus, the compositions of this invention are essentially constant boiling.

The compositions of this invention are in practical use non-flammable and of a low order of toxicity, i.e., less toxic than most other commercial solvents. As with all solvents, however, adequate ventilation during use should be provided. In addition to the properties of non-flammability and low order of toxicity, the compositions of this invention are also generally insensitive to ethanol depletion, being operable down to ethanol concentrations as low as about 0.8 weight percent.

The mixtures of this invention are effective solvents and have been shown to be particularly effective as rosin defluxers, e.g., for removing tarred rosin fluxes from circuit boards in the hot defluxing process. Additionally, since these mixtures are essentially constant boiling, they are stable to distillative separation. The ternary azeotrope of this invention is a particularly effective defluxer and is thus the preferred composition.

A clearer understanding of the invention may be had by reference to FIG. 2. In the following discussion the compositions of this invention will be identified as those falling within the confines of the broken lined parallelogram of FIG. 2 in terms of clock-face direction (clock-face is superimposed on FIG. 2, center of clock face being center of broken lined parallelogram).

The compositions within the confines of the said parallelogram are non-flammable. In FIG. 2 those compositions in the 12 to 6 o'clock direction produce flammable residues on evaporation, since they contain higher concentrations of flammable solvents than does the azeotrope of this invention. However, for those compositions within the parallelogram, i.e., the compositions of this invention, the degree of evaporation required to produce a flammable residue is far in excess of that which should be encountered in the practical operation of a vapor degreaser, e.g., in hot defluxing. The vapors from those compositions in the 12 to 6 o'clock direction within the confines of the parallelogram become flammable only after at least about 73% by volume of the composition has been evaporated. A line in FIG. 2 which generally approximates the 12 to 4 o'clock boundaries of the parallelogram, joins compositions which become flammable on evaporation of 75% by volume of the compositions. In the 10 o'clock direction some compositions within the confines of the parallelogram may become flammable but only after more than about 90% by volume has been evaporated.

In the 8 to 9 o'clock direction, i.e., in the direction of increasing 1,1,2-trichloro-1,2,2-trifluoroethane concentration, the mixtures at first appear to be operable to and beyond the parallelogram boundary. However, in areas beyond the confines of the parallelogram, the mixtures separate unacceptably on distillation into their components leaving behind residues too rich in 1,1,2-trichloro-1,2,2-trifluoroethane to be operable.

Ethanol and acetone are both commercially available and easily obtained.

Preparation of 1,1,2-trichloro-1,2,2-trifluoroethane may be carried out by any art-known method such as that described in "Chemistry of Organic Fluorine Compounds" by Milos Hudlicky, published by The Macmillan Company, New York, 1962, on page 337. The compositions of the present invention are prepared by admixing the components in the desired concentration.

EXAMPLES

The following examples are intended to be merely illustrative of the invention and not in limitation thereof. Unless otherwise indicated, all quantities are by weight.

EXAMPLE 1

This example demonstrates the existence of the ternary azeotrope of 1,1,2-trichloro-1,2,2-trifluoroethane, acetone and ethanol and describes the measurement of the boiling points of the compositions surrounding the azeotrope.

The equipment utilized consisted of a two-neck round bottom flask fitted with a volume-calibrated addition funnel and a reflux condenser with "Drierite" filled drying tube. Standard taper joints were unlubricated and were fitted with polytetrafluoroethylene sleeves. Suspended in the condenser was a calibrated thermometer capable of being read to 0.01° C., with its bulb in the vapor space of the flask.

In a series of experiments, weighed amounts of two of the three components were placed in the flask and the third component was added in increments from the addition funnel. After each addition, the flask contents were refluxed gently until the observed temperature was constant for 10 minutes, whereupon the temperature and the barometric pressure were recorded.

Each experiment produced a traverse of boiling point profile across a triangular coordinate plot of composition.

Figure 1:
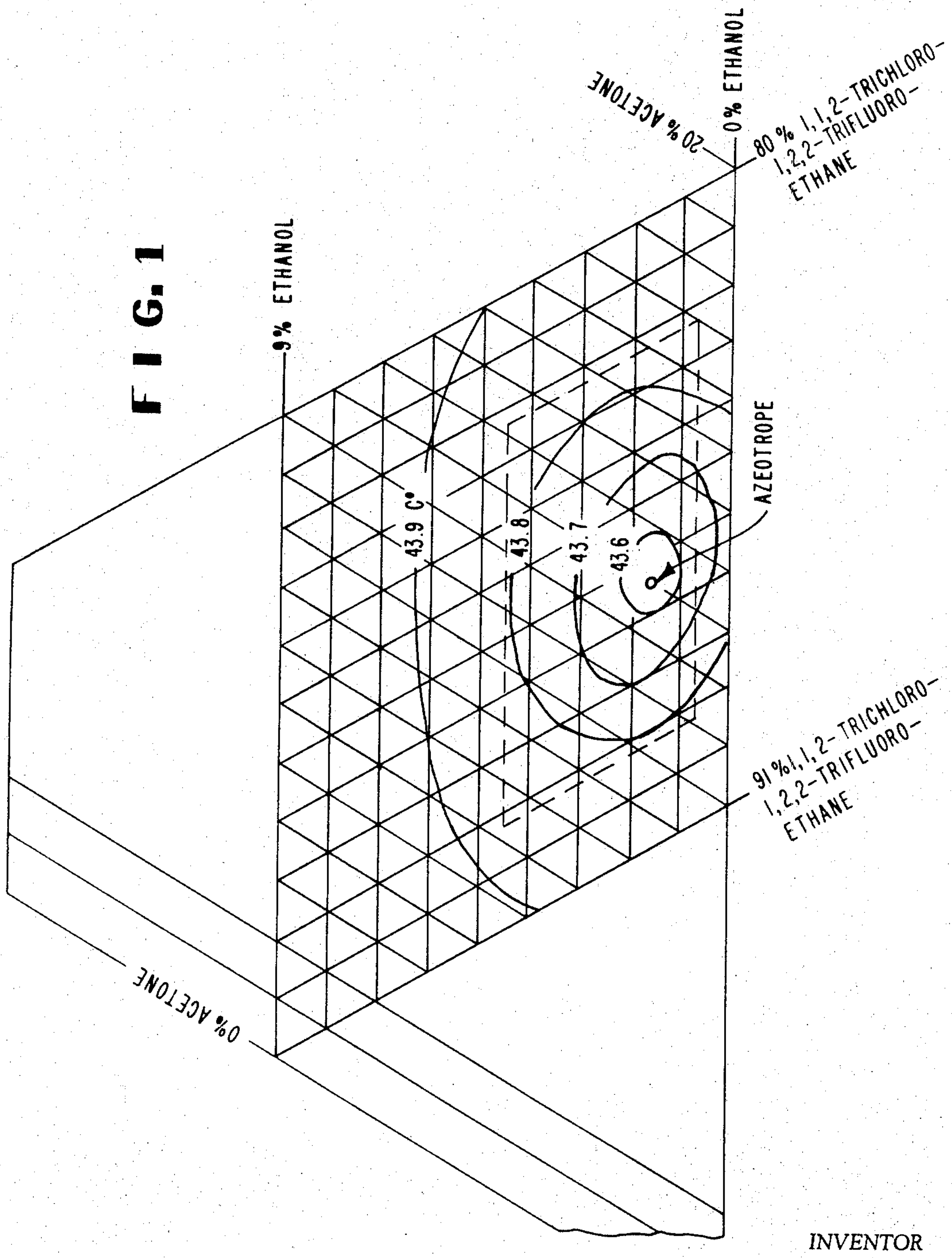
FIG. 1 is a partial triangular coordinate plot for mixtures of 1,1,2-trichloro-1,2,2-trifluoroethane, ethanol and acetone and shows.

The data were collected; corrected to 760 mm. pressure, and the temperature contours thereof were plotted in FIG. 1 by interpolation between points. In like manner it was determined that the azeotrope which would have the minimum boiling point contained about 86.4% 1,1,2-trichloro-1,2,2-trifluoroethane, about 12% acetone and about 1.6% by weight ethanol. The boiling point was estimated at about 43.6° C.

EXAMPLE 2

The compositions of the present invention fall within the confines of the broken lined parallelogram (operable region) of FIG. 2. A simulated clock face is superimposed on FIG. 2 to facilitate discussions relating thereto. This example demonstrates the flammability properties of evaporation residues of the invention compositions as represented by those points falling within the parallelogram boundaries in the region of 12 to 4 o'clock. The test used involved evaporating by boiling various mixtures in a Fischer-Tag Open Cup flammability tester (Fischer Scientific Co.) until the residue vapors could be ignited. On first flash, the cup was closed and the residual liquid was quickly poured into an ice-cold graduated cylinder for volume measurement. The data showing percent evaporated at first flash were plotted in a partial triangular coordinated plot (FIG. 2) and, by interpolation between points, a line was drawn which represents compositions which required evaporation to the extent of 75% by volume before the vapors of their residues became flammable. The numbers shown beside the plotted points are percent by volume evaporated at first flammability. These tests show that the invention compositions must be evaporated to the extent of about 73% by volume before the boundary region residues of the boundary region compositions within the parallelogram become flammable.

EXAMPLE 3

This example demonstrates the compositions chosen from within the defined operable region (i.e., within the parallelogram) at about the 8 o'clock position of FIG. 2, essentially retain their composition ratios even on evaporation of about 75% by volume. Contrastedly, however, a composition chosen in the 8 o'clock position but outside of the parallelogram rapidly change composition on evaporation due to the loss of ethanol and acetone. It should be noted that such a loss may in fact occur in vapor degreaser use. The test used involved evaporating two compositions, one labeled (a) which was chosen from inside the parallelogram and which consisted of about 88.5% 1,1,2-trichloro-1,2,2-trifluoroethane, 1.4% ethanol and 9.7% acetone, and the other composition labeled (b) chosen from outside the parallelogram and consisted of about 90.6% 1,1,2-trichloro-1,2,2-trifluoroethane, 1.6% ethanol and 7.8% acetone. Both compositions were boiled from a volume calibrated open container and periodically the resultant liquid residues were analyzed by gas chromatography to determine their compositions. The results are shown in FIG. 2 and the points shown thereon, by their position in the plot, indicate the composition of the residues. The numbers shown provide the points indicated in percent by volume the fraction of the composition evaporated. Those points marked 0 represent the two starting compositions. From these results it is clear that the compositions of the present invention essentially retain their composition ratios even on evaporation of about 75% by volume.

EXAMPLE 4

This example demonstrates the utility of the compositions of this invention as solvents for use in the removal of severely tarred flux from circuit boards. It further points out the particular efficacy of the azeotrope of the invention.

Commercial glass fiber reinforced epoxy resin circuit boards having copper circuits covered with solder were coated on the circuit side with liquid "Kester" 1544 rosin solder (Kester Solder Company, Inc.). To simulate the heat imparted during practical soldering operations, the circuit boards were baked in an oven for 15 minutes at selected temperatures. Upon removal from the oven, the circuit boards were suspended in a boiling sump containing a composition selected from the group listed below. The circuit boards were suspended therein for selected periods of time, removed therefrom and dried after which they were examined for tar and powder residues. The compositions employed and examined were:

| | Percent by weight | | |
|---|---|---|---|
| Composition No. | 1,1,2-trichloro-1,2,2-trifluoroethane | Acetone | Ethanol |
| 1 | 90.0 | 7.0 | 3.0 |
| 2 | 90.0 | 8.6 | 1.4 |
| 3 | 91.0 | 6.0 | 3.0 |
| 4 | 91.0 | 7.6 | 1.4 |
| 5 | 88.2 | 10.0 | 1.8 |
| 6 | 88.2 | 11.0 | 0.8 |
| 7 | 87.5 | 12.5 | ------------ |
| 8 | 86.4 | 12.0 | [1] 1.6 |
| 9 | 86.0 | 13.2 | 0.8 |
| 10 | 86.0 | 14.0 | 0.0 |
| 11 | 96.0 | ------------ | 4.0 |

[1] Invention azeotrope—Outside the invention: 1, 2, 3, 4, 7, 10, 11. Within the invention: 5, 6, 8, 9.

When circuit boards which had been baked at 121° C. were treated with the listed compositions, the following results were obtained:

After 1 minute exposure in the sump ethanol-free Compositions Nos. 7 and 10 left small and large powder residues respectively whereas all other compositions yielded clean circuit boards or boards with only slight residues of powder. Composition No. 8, the invention azeotrope, yielded an entirely clean board.

After 3 minutes exposure in the sump all listed compositions removed all flux residues except Composition No. 7 which left a powdery residue.

When circuit boards which had been baked at 177° C. were treated with the listed compositions, the following results were obtained:

After 3 minutes exposure, Composition No. 8, the invention azeotrope, removed all but a trace of powder from circuit boards. Ternary Compositions Nos. 4, 5, 6, 7 and 9 left behind tar residues and ternary Compositions Nos. 1, 2 and 3 left behind powdery residues. Composition No. 11 left behind a heavy powder residue.

It should be noted from the results listed above that the compositions of the present invention are effective defluxers. Composition No. 8, the azeotrope of this invention, being particularly effective, particularly compared with Compositions Nos. 7 and 11, both of which have found extensive use in the field.

The foregoing detailed description has been given for clarity of understanding only and no unnecessary limitations are to be understood therefrom. The invention is not limited to exact details shown and described for obvious modifications will occur to one skilled in the art.

The embodiments of the invention in which an exclusive property or privilege is claimed are defined as follows:

1. A ternary azeotrope consisting of about 86.4 weight percent 1,1,2-trichloro-1,2,2-trifluoroethane, about 12.0 weight percent acetone and about 1.6 weight percent ethanol, said azeotrope having a boiling point of about 43.6° C.

2. A process for removing degraded rosin fluxes from circuit boards comprising contacting the degraded fluxes with the azeotrope of claim 1.

References Cited

UNITED STATES PATENTS

| | | | |
|---|---|---|---|
| 2,999,815 | 9/1961 | Eiseman | 252—171 |
| 3,530,073 | 9/1970 | Clark et al. | 252—170 |

LEON D. ROSDOL, Primary Examiner

W. E. SCHULZ, Assistant Examiner

U.S. Cl. X.R.

252—171, DIG. 9